(12) United States Patent
Kimura et al.

(10) Patent No.: US 10,975,775 B2
(45) Date of Patent: Apr. 13, 2021

(54) JET ENGINE

(71) Applicant: IHI Corporation, Koto-ku (JP)

(72) Inventors: Takehiko Kimura, Tokyo (JP); Takeshi Murooka, Tokyo (JP); Atsushi Kamei, Tokyo (JP)

(73) Assignee: IHI Corporation, Koto-ku (JP)

( * ) Notice: Subject to any disclaimer, the term of this patent is extended or adjusted under 35 U.S.C. 154(b) by 294 days.

(21) Appl. No.: 15/697,969

(22) Filed: Sep. 7, 2017

(65) Prior Publication Data

US 2017/0370295 A1    Dec. 28, 2017

Related U.S. Application Data

(63) Continuation of application No. PCT/JP2015/065308, filed on May 27, 2015.

(51) Int. Cl.
| | |
|---|---|
| *F02C 9/20* | (2006.01) |
| *F01D 17/16* | (2006.01) |
| *F02C 7/042* | (2006.01) |
| *F02C 3/04* | (2006.01) |
| *F02K 3/06* | (2006.01) |
| *F02K 1/16* | (2006.01) |

(52) U.S. Cl.
CPC .............. *F02C 9/20* (2013.01); *F01D 17/162* (2013.01); *F02C 3/04* (2013.01); *F02C 7/042* (2013.01); *F02K 1/16* (2013.01); *F02K 1/165* (2013.01); *F02K 3/06* (2013.01); *F05D 2220/326* (2013.01); *F05D 2220/327* (2013.01); *F05D 2240/12* (2013.01); *F05D 2270/02* (2013.01); *F05D 2270/101* (2013.01); *Y02T 50/60* (2013.01)

(58) Field of Classification Search
CPC ........ F01D 1/04; F04D 29/522; F04D 29/526; F04D 19/007
USPC .............................................. 415/148, 199.5
See application file for complete search history.

(56) References Cited

U.S. PATENT DOCUMENTS

| | | |
|---|---|---|
| 4,069,661 A | 1/1978 | Rundell et al. |
| 4,080,785 A | 3/1978 | Koff et al. |
| | (Continued) | |

FOREIGN PATENT DOCUMENTS

| | | |
|---|---|---|
| EP | 0 778 394 B1 | 11/2002 |
| GB | 875496 A | 8/1961 |
| | (Continued) | |

*Primary Examiner* — Michael Lebentritt
*Assistant Examiner* — Eric J Zamora Alvarez
(74) *Attorney, Agent, or Firm* — Oblon, McClelland, Maier & Neustadt, L.L.P.

(57) ABSTRACT

A jet engine which includes: a fan with a plurality of stages of rotor blades; a compressor compressing air sent from the fan; a combustor generating combustion gas by using compressed air generated by the compressor; a turbine generating a driving force from the combustion gas; a nozzle discharging the combustion gas; a variable guide vane disposed upstream of the rotor blades of a second and later stage of the rotor blades of the fan and adjusts an inlet angle of air flow against the second and later stage of the rotor blades; a fluid resistance adjusting device adjusting a fluid resistance at the nozzle; and a controller which controlling the variable guide vane such that the inlet angle at the time of cruise flight is smaller than the inlet angle at the time of acceleration.

5 Claims, 7 Drawing Sheets

(56) References Cited

U.S. PATENT DOCUMENTS

| | | | |
|---|---|---|---|
| 4,175,384 A | 11/1979 | Wagenknecht et al. | |
| 4,221,114 A | 9/1980 | Wilde et al. | |
| 4,581,889 A | 4/1986 | Carpenter et al. | |
| 4,874,289 A | 10/1989 | Smith, Jr. et al. | |
| 4,947,643 A | 8/1990 | Pollak et al. | |
| 5,259,188 A | 11/1993 | Baxter et al. | |
| 5,402,638 A * | 4/1995 | Johnson | F02K 3/075 60/204 |
| 5,809,772 A * | 9/1998 | Giffin, III | F02K 3/075 60/226.1 |
| 5,833,140 A | 11/1998 | Loffredo et al. | |
| 5,911,679 A * | 6/1999 | Farrell | F01D 17/162 415/149.2 |
| 5,988,980 A * | 11/1999 | Busbey | F01D 5/143 415/78 |
| 7,134,271 B2 | 11/2006 | Baughman et al. | |
| 7,216,475 B2 | 5/2007 | Johnson | |
| 7,614,210 B2 | 11/2009 | Powell et al. | |
| 7,765,789 B2 * | 8/2010 | Johnson | F01D 17/162 60/226.1 |
| 8,127,532 B2 * | 3/2012 | Howe | F02K 1/1207 60/226.3 |
| 9,920,710 B2 * | 3/2018 | Dawson | F02K 3/077 |
| 2003/0074884 A1 | 4/2003 | Snow et al. | |
| 2011/0120083 A1 * | 5/2011 | Giffin | F01D 5/022 60/226.3 |
| 2011/0167784 A1 | 7/2011 | Johnson et al. | |
| 2011/0167791 A1 | 7/2011 | Johnson et al. | |
| 2011/0167792 A1 | 7/2011 | Johnson et al. | |
| 2011/0171007 A1 | 7/2011 | Johnson et al. | |
| 2012/0045318 A1 * | 2/2012 | LaMaster | F04D 29/023 415/151 |
| 2014/0345253 A1 * | 11/2014 | Dawson | F02K 3/077 60/226.3 |
| 2016/0076548 A1 * | 3/2016 | Reynolds | F01D 5/141 415/148 |
| 2017/0023252 A1 * | 1/2017 | Tanaka | F02K 3/10 |
| 2019/0047016 A1 * | 2/2019 | Mathon | B05C 11/025 |

FOREIGN PATENT DOCUMENTS

| | | |
|---|---|---|
| JP | 50-124012 A | 9/1975 |
| JP | 52-1221 A | 1/1977 |
| JP | 54-27613 | 3/1979 |
| JP | 61-85560 A | 5/1986 |
| JP | 2-115558 A | 4/1990 |
| JP | 10-176604 A | 6/1998 |
| JP | 2000-328902 A | 11/2000 |
| JP | 2012-41929 A | 3/2012 |
| JP | 2012-62801 A | 3/2012 |
| JP | 2013-506081 A | 2/2013 |

* cited by examiner

JET ENGINE

This application is a Continuation Application based on International Application No. PCT/JP2015/065308, filed on May 27, 2015.

TECHNICAL FIELD

The present disclosure relates to a jet engine.

BACKGROUND ART

As described in Patent Document 1, a jet engine is mounted on an airplane as a thrust generating device. In the jet engine, the diameters of an air intake and a fan are designed such that necessary amount of air at the time of maximum power can be taken in. When increasing-power, the jet engine generates necessary thrust by increasing rotating speed of the fan so as to take in large quantity of air from the air intake, and compressing and discharging air from a nozzle at high speed.

CITATION LIST

Patent Document

[Patent Document 1] Japanese Unexamined Patent Application. First Publication No. 2012-62801

SUMMARY

Technical Problem

When an airplane is in cruise flight, since a thrust of a jet engine is throttled back compared to a case where the airplane is accelerating, the amount of air the jet engine takes in decreases. Therefore, a conventional jet engine reduces the rotating speed of a fan when an airplane is in cruise flight compared to a case where the airplane is accelerating. However, as described above, since the diameter of the air intake of the jet engine is designed such that the necessary amount of air can be taken in at the time of accelerating, a large amount of air flows in from the air intake even when the rotating speed of the fan is reduced. As a result, the air which is flown in overflows from the air intake and a so-called intake spillage drag is generated.

In order to keep the airplane flying in cruising speed, it is necessary to generate thrust of the jet engine to eliminate speed reduction due to the intake spillage drag. Therefore, the intake spillage drag worsens fuel efficiency.

In order to minimize worsening of fuel efficiency due to the intake spillage drag, an improved jet engine is proposed in which a second bypass channel is further provided outside of a normal core channel and a bypass channel such that only thrust is changed without changing flow amount of air as a whole which is taken into the jet engine even when the airplane is in cruise flight by changing flow amount of air in the second bypass channel when an airplane is accelerating from when the airplane is in cruise flight.

However, in order to adjust the amount of air flown into the second channel, the proposed improved jet engine needs to be provided with movable stator vanes provided at an inlet of the core channel a low-pressure compressor, a high-pressure compressor, a high-pressure turbine, and a low-pressure turbine, or switching plates which switch channels in which air flows or flow amount adjusting valves for the second bypass channel. Therefore, a lot of driving mechanisms for driving those devices are necessary. Such improved jet engine incurs weight increase by providing the second channel, and weight increase and reduction of reliability by providing a lot of driving mechanisms. Furthermore, since weight increase is large in the improved jet engine, it is not possible to obtain enough improvement in fuel efficiency as a result.

The present disclosure is made in consideration of the above-described circumstances, and an object thereof is to improve fuel efficiency by reducing the intake spillage drag without providing the second channel and necessitating a lot of driving mechanisms.

Solution to Problem

A first aspect of the present disclosure is a jet engine which includes: a fan provided with a plurality of stages of rotor blades; a compressor which compresses air which is sent from the fan; a combustor which generates combustion gas by using the compressed air generated by the compressor; a turbine which generates a driving force from the combustion gas, and a nozzle which discharges the combustion gas. The jet engine further includes: a variable guide vane which is disposed upstream of a second and later stage rotor blades of the fan and which adjusts an inlet angle of air flow against the second and later stage rotor blades; a fluid resistance adjusting device which adjusts a fluid resistance at the nozzle; and a controller which controls the variable guide vane such that the inlet angle at the time of cruise flight is smaller than the inlet angle at the time of acceleration and controls the fluid resistance adjusting device such that an increase in the fluid resistance due to an increase in a volume flow at an outlet of the fan corresponding to a reduction in the inlet angle is suppressed.

In a second aspect of the present disclosure, the fluid resistance adjusting device is an opening space varying mechanism which adjusts m opening space of the nozzle.

In a third aspect of the present disclosure, rotor blades which are disposed downstream of the variable guide vane are disposed closer to a center of rotation of the rotor blades than the rotor blades disposed upstream of the variable guide vane.

In a fourth aspect of the present disclosure, the controller maximizes a rotating speed of the fan at the time of cruise flight.

In a fifth aspect of the present disclosure, the jet engine further includes: a cylindrical casing in which the fan, the compressor, the combustor, and the turbine are accommodated; and an intermediate channel which changes a region where air flows from a radially outer side of the casing to a radially inner side of the casing where the variable guide vane is provided, in which the variable guide vane is disposed adjacent to and upstream of the rotor blades disposed downstream of the intermediate channel.

According to the present disclosure, the variable guide vane which is disposed upstream of the second and later stags rotor blades of the fan is controlled such that the inlet angle against the rotor blades downstream of the second and later stage rotor blades is reduced at the time of cruise flight compared to the inlet angle at the time of acceleration. Accordingly, the amount of work done by the rotor blades disposed downstream of the variable guide vanes against the air flow decreases, the compression rate of the fan decreases, and the pressure of air discharged from the nozzle decreases. As a result, it is possible to throttle back the thrust by reducing the flow velocity of the exhaust gas discharged from the nozzle without reducing the flow amount of air which is taken in. Furthermore, with the reduction of air pressure at the outlet of the fan, although the air pressure at the inlet of the nozzle decreases and the volume flow of exhaust gas increases, the increase in fluid resistance by the nozzle is suppressed by the flow resistance adjusting device. In accordance with the present disclosure, it is possible to improve fuel efficiency by reducing the intake spillage drag without providing a second bypass channel and necessitating a lot of driving mechanisms.

DESCRIPTION OF EMBODIMENTS

Hereinafter, an embodiment of an jet engine according to the present disclosure will be described with reference to the drawings. In addition, in the following drawings, the scale of each member is appropriately changed such that each member can be recognized.

Figure 1:
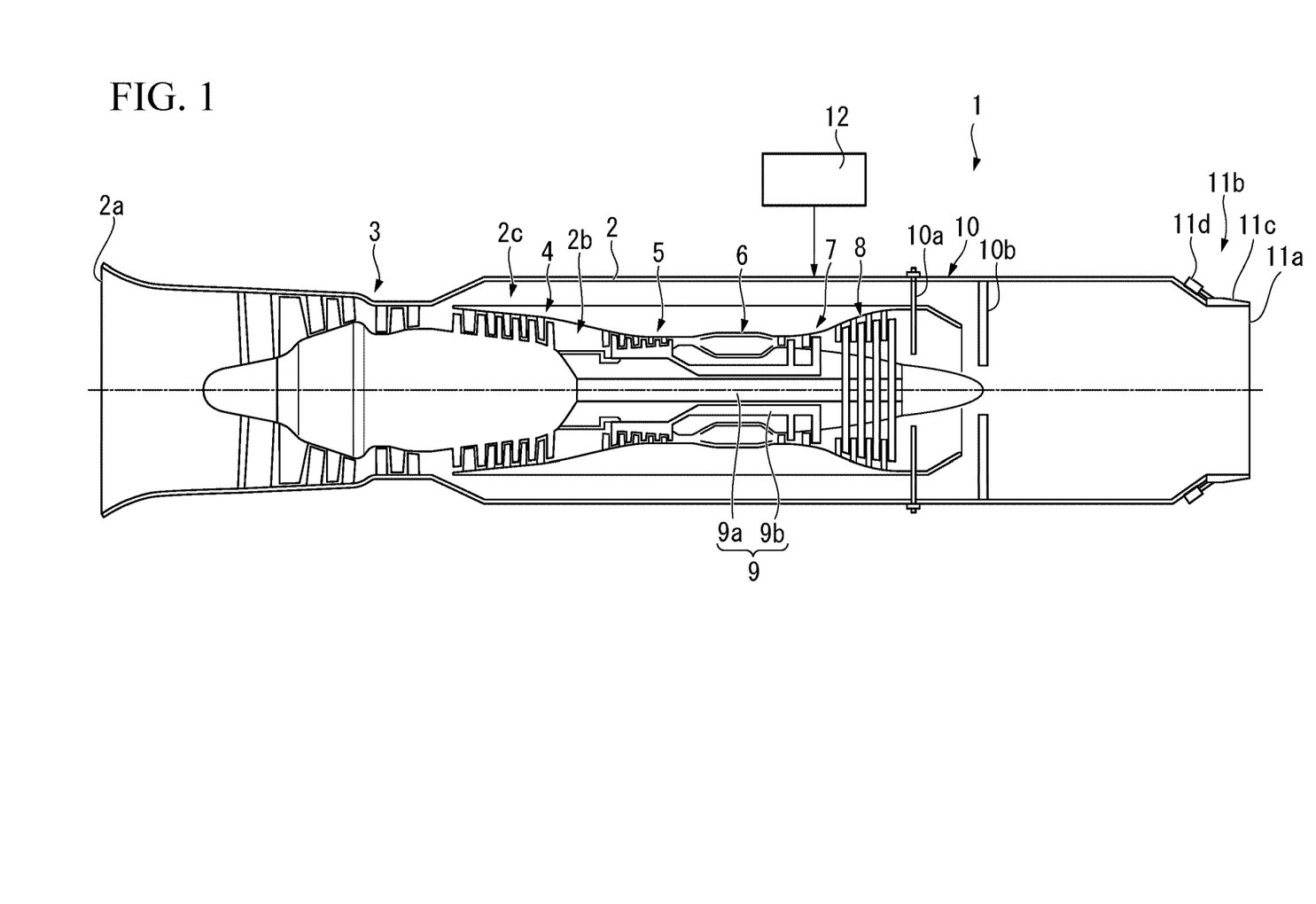
FIG. 1 is a cross-sectional view schematically showing a jet engine which is an embodiment of the present disclosure.

FIG. 1 is a cross-sectional view schematically showing a jet engine 1 of the present embodiment. As shown in FIG. 1, the jet engine 1 of the present embodiment is a turbofan engine which is provided with a casing 2, a fan 3, a low-pressure compressor 4, a high-pressure compressor 5, a combustor 6, a high-pressure turbine 7, a low-pressure turbine 8, a shaft 9, an augmentor 10, a variable exhaust nozzle 11 (nozzle), and a controller 12 (control device).

The casing 2 is a cylindrical member which accommodates the fan 3, the low-pressure compressor 4, the high-pressure compressor 5, the combustor 6, the high-pressure turbine 7, the low-pressure turbine 8, the shaft 9, and the augmentor 10. An opening at a first end (left side of FIG. 1) of the casing 2 is an air intake 2a which takes in air into the jet engine 1 and the variable exhaust nozzle 11 is provided at a second end (right side of FIG. 1) of the casing 2.

A core channel 2b which is a channel provided radially inner side of the casing 2 and a bypass channel 2c which is a channel provided radially outer side of the casing 2 are formed inside of the casing 2. As shown in FIG. 1, the core channel 2b and the bypass channel 2c are provided by radially dividing the inside of the casing 2 downstream of the fan 3. The core channel 2b is a channel which guides air to the combustor 6 and guides combustion gas discharged from the combustor 6 toward the augmentor 10 via the high-pressure turbine and the low-pressure turbine 8. The bypass channel 2c is a channel which guides force fed air from the fan 3 toward the augmentor 10 by bypassing the low-pressure compressor 4, the high-pressure compressor 5, the combustor 6, the high-pressure turbine 7, and the low-pressure turbine 8.

Figure 2:
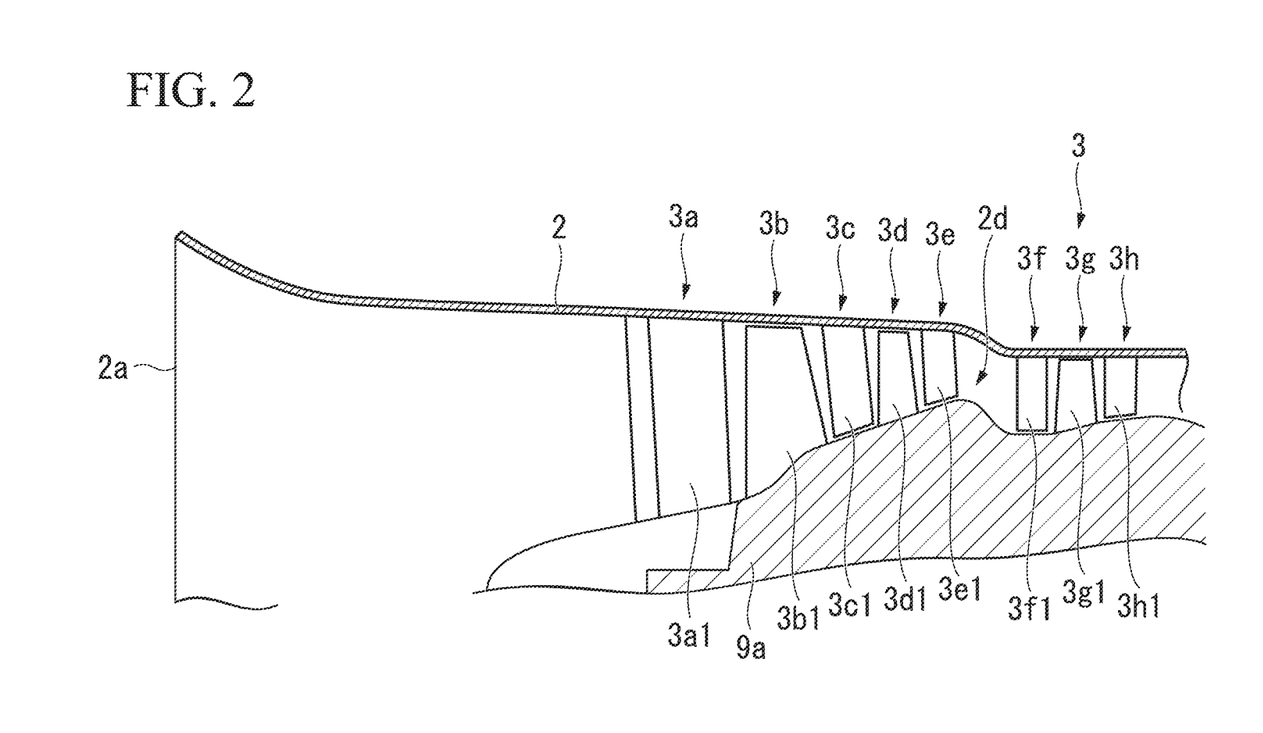
FIG. 2 is an enlarged view of a fan provided to the jet engine which is an embodiment of the present disclosure.
Figure 3:
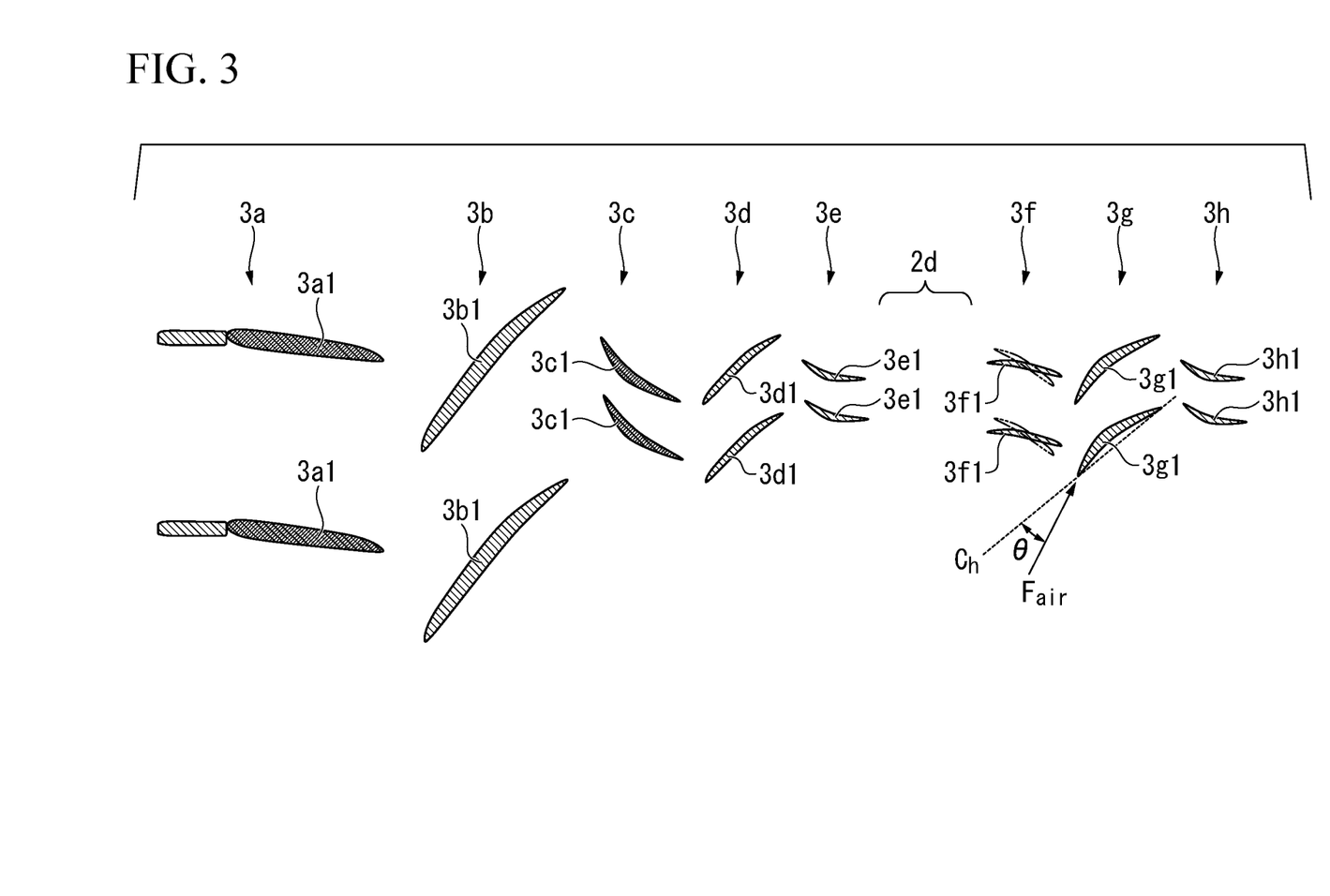
FIG. 3 is a view schematically showing blades provided to the jet engine which is an embodiment of the present disclosure.

The fan 3 is provided at the most upstream portion inside of the casing 2. FIG. 2 is an enlarged view of the fan 3 shown in FIG. 1. FIG. 3 is a view schematically showing part of blades provided to the fan 3. As shown in those drawings, the fan 3 includes an inlet guide vane mechanism $3a$, a first stage rotor blade row $3b$, a first stage stator vane row $3c$, a second stage rotor blade row $3d$, a second stage stator vane row $3e$, a variable guide vane mechanism $3f$, a third stage rotor blade row $3g$, and a third stage stator vane row $3h$.

The inlet guide vane mechanism includes inlet guide vanes which are fixed to the casing 2 and plurally disposed in the circumferential direction of the casing 2, and an actuator (not shown) which adjusts angles of the inlet guide vanes $3a1$. Under the control of the controller 12, the inlet guide vane mechanism $3a$ rectifies flow of air which is taken into the fan 3 by adjusting angles of the inlet guide vanes $3a1$.

The first stage rotor blade row $3b$ is composed of rotor blades $3b1$ which are fixed to a low-pressure axis $9a$ of the shaft 9 which will be described later and plurally disposed in the circumferential direction of the shaft 9, and is disposed downstream of the inlet guide vanes $3a1$. The rotor blades $3b1$ rotate in accordance with rotation of the shaft 9 and force feed air which has passed the inlet guide vanes $3a1$ downstream.

The first stage stator vane row $3c$ is composed of stator vanes $3d$ which are fixed to the casing 2 and plurally disposed in the circumferential direction of the casing 2, and is disposed downstream of the first stage rotor blade row $3b$. The stator vanes $3c1$ rectify flow of air which is discharged from the first stage rotor blade row $3b$.

The second stage rotor blade row $3d$ is composed of rotor blades $3d1$ which are fixed to a low-pressure axis $9a$ of the shaft 9 and plurally disposed in the circumferential direction of the shaft and is disposed downstream of the first stage stator vane row $3c$. The rotor blades $3d1$ rotate in accordance with rotation of the shaft 9 and force feed air which has passed the first stage state vane row $3e$ downstream.

The second stage stator vane row $3e$ is composed of stator vanes $3e1$ which are fixed to the casing 2 and plurally disposed in the circumferential direction of the casing 2, and is disposed downstream of the second stage rotor blade row $3d$. The stator vanes $3e1$ rectify flow of air which is discharged from the second stage rotor blade row $3d$, Here, the stator vanes $3e1$ rectify air flow such that air flows in parallel with the shaft 9 (such that air flows axially).

The variable guide vane mechanism $3f$ is provided with variable guide vanes $3f1$ which are fixed to the casing 2 and plurally disposed in the circumferential direction of the casing 2, and an actuator (not shown) which adjusts angles of the variable guide vanes $3f1$. Under the control of the controller 12, the variable guide vane mechanism $3f$ adjusts angles of the variable guide vanes $3f1$ and changes inlet angle of air against rotor blades $3g1$ of the third stage rotor blade row $3g$ which is disposed downstream.

Here, the inlet angle θ is an angle of air flow (shown as an arrow $F_{air}$) against a chord ($C_h$) which is a line connecting a leading edge and a trailing edge of the rotor blade 3g1 in FIG. 3. Here, the inlet angle θ is shown when seen in rotational relative coordinates which are rotating with the rotor blade 3g1. When the inlet angle is great, the amount of work done by the rotor blades 3g1 against the air flow is increased. As a result, air pressure increases significantly. On the other hand, when the inlet angle is small, the amount of work done by the rotor blades 3g1 against the air flow is reduced. As a result, increasing in air pressure is suppressed or air pressure does not change. That is, by the inlet angle against the rotor blades 3g1 being small, the rotor blades 3g1 spin around, and pressure increase in air is suppressed. For example, the inlet angle becomes great when the air flow is moved by the variable guide vanes 3f1 so as to strengthen rotation of air flow in rotating direction of the fan 3 (when the variable guide vanes 3f1 are in orientation as shown in solid line in FIG. 3), and the inlet angle becomes small when the air flow is moved by the variable guide vanes 3f1 so as to weaken rotation of air flow in the rotating direction of the fan 3 (when the variable guide vanes 3f1 are oriented as shown in two-dot chain line in FIG. 3)

As shown in FIG. 2, the variable guide vane mechanism 3f is disposed downstream of the second stage stator vane row 3e (upstream of the third stage rotor blades 3g1) interposing an intermediate channel 2d curved toward radially inner side of casing 2 toward downstream. In the present embodiment, the variable guide vanes 3f1, the rotor blades 3g1 and stator vanes 3h1 disposed downstream of the variable guide vanes 3f1 are disposed closer to a center of rotation of the rotor blades 3g1 than the rotor blades 3d1 disposed upstream of the variable guide vanes 3f1. The intermediate channel 2d changes a region where air flows from radially outer side of the casing 2 to radially inner side of the casing 2 where the variable guide vanes 3f1 are disposed. The intermediate channel 2d is curved without changing sectional area of a flow channel. By having the intermediate channel 2d, circumferential velocity of the rotor blades which are disposed closer to the center of rotation of the rotor blades decreases. As a result, compared to a case where the intermediate channel 2d is not provided, it is possible to suppress generation of shockwaves when flow direction of air is changed by the variable guide vanes 3f1 and to suppress increase in pressure loss, Here, when defining a position of the variable guide vanes 3f1 in relation to the intermediate channel 2d, the variable guide vanes 3f1 are located adjacent to and upstream of the rotor 3g1 (the rotor blades 3g1 of the third stage rotor blade row 3g) located downstream of the intermediate channel 2d.

The third stage rotor blade row 3g is composed of rotor blades 3g1 which are fixed to the low-pressure axis 9a of the shaft 9 and plurally disposed in the circumferential direction of the shaft 9, and is disposed downstream of the variable guide vanes 3f1. The rotor blades 3g1 rotate in accordance with rotation of the shaft 9, force feed air which has passed the variable guide vane mechanism 3f downstream when the inlet angle of air is great. The rotor blades 3g1 let air which has passed the variable guide vane mechanism 3f pass downstream without increasing air pressure when the inlet angle of air is small.

The third stage stator vane row 3h is composed of stator vanes 3h1 which are fixed to the casing 2 and plurally disposed in the circumferential direction of the casing 2, and is disposed downstream of the third stage rotor blade row 3g.

The stator vanes 3h1 rectify flow of air which is discharged from the third stage rotor blade row 3g.

Returning to FIG. 1, the low-pressure compressor 4 is disposed at the most upstream portion in the core channel 2h. The low-pressure compressor 4 is made of rotor blade rows composed of rotor blades fixed to the low-pressure axis 9a of the shaft 9 and stator vane rows composed of stator vanes fixed to the casing 2 arranged one after the other in a plurality of stages. In the low-pressure compressor 4, the rotor blades rotate in accordance with rotation of the shaft 9 and compresses air taken into the core channel 2b while the stator vanes are rectifying the flow of the air.

The high-pressure compressor 5 is disposed downstream of the low-pressure compressor 4 in the core channel 2b. The high-pressure compressor 5 is made of rotor blade rows composed of rotor blades fixed to a high-pressure axis 9b of the shaft 9 which will be described later and stator vane rows composed of stator vanes fixed to the casing 2 arranged one after the other in a plurality of stages. In the high-pressure compressor 5, the rotor blades rotate in accordance with rotation of the shaft 9 and further compress air compressed by the low-pressure compressor 4 while the stator vanes are rectifying the flow of the air.

The combustor 6 is disposed downstream of the high-pressure compressor 5 in the core channel 2b. The combustor 6 is provided with a fuel nozzle and an ignition device which are not shown. The combustor 6 generates combustion gas by burning an air-fuel mixture gas composed of a compressed air generated in the high-pressure compressor 5 and a fuel.

The high-pressure turbine 7 is disposed downstream of the combustor 6 in the core channel 2b. The high-pressure turbine 7 is made of rotor blade rows composed of rotor blades fixed to the high-pressure axis 9b of the shaft 9 and stator vane rows composed of stator vanes fixed to the casing 2 arranged one after the other in a plurality of stages. In the high-pressure turbine 7, the rotor blades rotate by the rotor blades receiving the combustion gas generated in the combustor 6 while the stator vanes are rectifying the combustion gas. Accordingly, the high-pressure turbine 7 rotates the high-pressure axis 9b of the shaft 9.

The low-pressure turbine 8 is disposed downstream of the high-pressure turbine 7 in the core channel 2b. The low-pressure turbine 8 is made of rotor blade rows composed of rotor blades fixed to the low-pressure axis 9a of the shaft 9 and stator vane rows composed of stator vanes fixed to the casing 2 arranged one after the other in a plurality of stages. In the low-pressure turbine 8, the rotor blades rotate by the rotor blades receiving the combustion gas which has passed the high-pressure turbine 7 while the stator vanes are rectifying the combustion gas. Accordingly, the low-pressure turbine 8 rotates the low-pressure axis 9a of the shaft 9.

The shaft 9 is provided with the low-pressure axis 9a of radially inner side and the high-pressure axis 9b of radially outer side. The shaft 9 has a double-axis structure in which the low-pressure axis 9a and the high-pressure axis 9b can rotate individually. The rotor blades of the low-pressure turbine 8, the rotor blades of the low-pressure compressor 4, the rotor blades of the fan 3 (the rotor blades 3b1, the rotor blades 3d1, and the rotor blades 3g1) are fixed to the low-pressure axis 9a. The low-pressure axis 9a transfers a rotating power, which is generated by the rotor blades of the low-pressure turbine 8 receiving the combustion gas and rotating to the rotor blades of the low-pressure compressor 4 and the rotor blades of the fan 3, and rotates the rotor blades of the low-pressure compressor 4 and the rotor blades of the fan 3. The rotor blades of the high-pressure turbine 7 and the rotor blades of the high-pressure compressor 5 are fixed to the high-pressure axis 9b. The high-pressure axis 9b transfers a rotating power, which is generated by the rotor blades of the high-pressure turbine 7 receiving the combustion gas and rotating to the rotor blades of the high-pressure compressor 5, and rotates the rotor blades of the high-pressure compressor 5.

The augmentor 10 is disposed downstream of the low-pressure turbine 8. The augmentor 10 is provided with a fuel injection device 10a, a flame stabilizer 10b, and an ignition device (not shown), and strengthens thrust by afterburning the fuel by using oxygen included in an air-fuel mixture gas composed of the combustion gas which has passed the low-pressure turbine 8 and air which has passed the bypass channel 2c.

The variable exhaust nozzle 11 is disposed at a downstream end portion of the casing 2. The variable exhaust nozzle 11 discharges the combustion gas exhausted from the core channel 2b and air flow exhausted from the bypass channel 2c backward of the jet engine 1. The variable exhaust nozzle 11 is provided with a nozzle 11a which is an open end discharging the combustion gas and the air flow, and a movable portion 11b (flow resistance adjusting device and opening space varying mechanism) which changes an opening space of the nozzle 11a. The movable portion 11b is provided with flaps 11c arranged in circumferential direction of the nozzle 11a and an actuator 11d and the like which adjusts an angle of the flaps 11c. The movable portion 11b adjusts fluid resistance at the nozzle 11a by changing the opening space of the nozzle 11a.

The controller 12 controls overall jet engine 1 of the present embodiment. For example, the controller 12 controls rotating speed of the fan 3, angles of the variable guide vanes 3f1, opening space (throat area) of the nozzle 11a, fuel supply amount to the augmentor 10, and the like based on instructions from a throttle lever (a throttle lever angle). In the present embodiment, when an airplane is in cruise flight, the controller 12 maximizes the rotating speed of the fan 3 in the same manner as when an airplane is accelerating and controls the angles of the variable guide vanes 3f1 such that the inlet angle is smaller than the inlet angle when an airplane is accelerating. At the same time, the controller 12 controls the variable exhaust nozzle 11 so as to suppress an increase in fluid resistance due to an increase in volume flow corresponding to a reduction in the inlet angle. The controller 12 may be generally known computers including CPU, RAM, ROM, and the like such that the controller 12 can perform above-described controls. Details of the control by the controller 12 may be defined by software which can be changed or updated in arbitrarily by users. As shown in an arrow extending from the controller 12 in FIG. 1, the controller 12 may be electrically or electronically connected to the fan 3, the variable guide vanes 3f1, the variable exhaust nozzle 11, the augmentor 10, and the like so that necessary signals for the control by the controller 12 can be communicated between the controller 12 and the above-described devices.

In the jet engine 1 of the present embodiment, by driving of the fan 3, air is taken in from outside via the air intake 2a of the casing 2, and air which is taken in is distributed to the core channel 2b and the bypass channel 2c. Air which flows in the core channel 2b is compressed by the low-pressure compressor 4 and the high-pressure compressor 5, supplied to the combustor 6, and is burnt with the fuel. Accordingly, combustion gas is generated, the combustion gas flows in the core channel 2b, and the combustion gas is discharged from the variable exhaust nozzle 11. Air which flows in the bypass channel 2c flows by bypassing the low-pressure compressor 4, the high-pressure compressor 5, the combustor 6, the high-pressure turbine 7, and the low-pressure turbine 8, and is discharged from the variable exhaust nozzle 11 with the combustion gas. The combustion gas and air which flows in the bypass channel 2c are discharged from the variable exhaust nozzle 11, and a thrust is obtained accordingly.

When the combustion gas which flows in the core channel 2b passes the high-pressure turbine 7, the rotor blades of the high-pressure turbine 7 are rotated, and rotational power is generated. The rotational power is transferred to the high-pressure compressor 5 vie the high-pressure axis 9b of the shaft 9, and the rotor blades of the high-pressure compressor 5 are rotated accordingly. When the combustion gas which flows in the core channel 2b passes the low-pressure turbine 8, the rotor blades of the low-pressure turbine 8 are rotated, and rotational power is generated. The rotational power is transferred to the low-pressure compressor 4 and the fan 3 vie the low-pressure axis 9a of the shaft and the rotor blades of the low-pressure compressor 4 and the rotor blades of the fan 3 are rotated accordingly.

When great thrust is necessary, under the control of the controller 12, the augmentor 10 supplies feel to the combustion gas which has passed the high-pressure turbine 7 and the low-pressure turbine 8 so as to afterburn the combustion gas, and the thrust is augmented. At this time, since the volume flow of the exhaust gas is increased due to afterburning of the combustion gas, the opening space of the nozzle 11a is increased by the movable portion 11b so as not to increase fluid resistance at the nozzle 11a.

In the jet engine 1 of the present embodiment, when an airplane is in cruise flight, the variable guide vanes 3f1 are controlled such that the inlet angle against the rotor blades 3g1 composing the third stage rotor blade row 3g downstream thereof is reduced compared to the inlet angle against the rotor blades 3g1 when an airplane is accelerating. Accordingly, the amount of work done by the rotor blades 3g1 disposed downstream of the variable guide vanes 3f1 against the air flow decreases, and a compression rate of the fan 3 decreases. As a result, since pressure in air supplied to the nozzle 11a is reduced, it is possible to throttle back the thrust by reducing the flow velocity of the combustion gas discharged from the nozzle 11a without reducing the flow amount of air which is taken in from the air intake 2a.

In this case, pressure in air supplied to the nozzle 11a is reduced, air pressure at downstream of the combustor 6 is reduced, and volume flow of exhaust gas is increased. In order not to increase fluid resistance at the nozzle 11a due to the increase in the volume flow of the exhaust pas, the opening space of the nozzle 11a is increased by the movable portion 11b. That is, in the jet engine 1 of the present embodiment, the opening space of the nozzle 11a is increased by the movable portion 11b even when an airplane is in cruise flight in which the augmentor 10 is not used. Accordingly, since an increase in fluid resistance due to the nozzle 11a is suppressed, it is possible to smoothly discharge exhaust gas flow and to suppress increase in pressure loss.

According to the jet engine 1 of the present embodiment, when an airplane is in cruise flight, it is possible to decrease only thrust compared to when an airplane is accelerating without changing intake volume of the fan 3. Accordingly, it is possible to improve fuel efficiency by reducing the intake spillage drag without providing a second bypass channel and necessitating a lot of driving mechanism.

Figure 4:
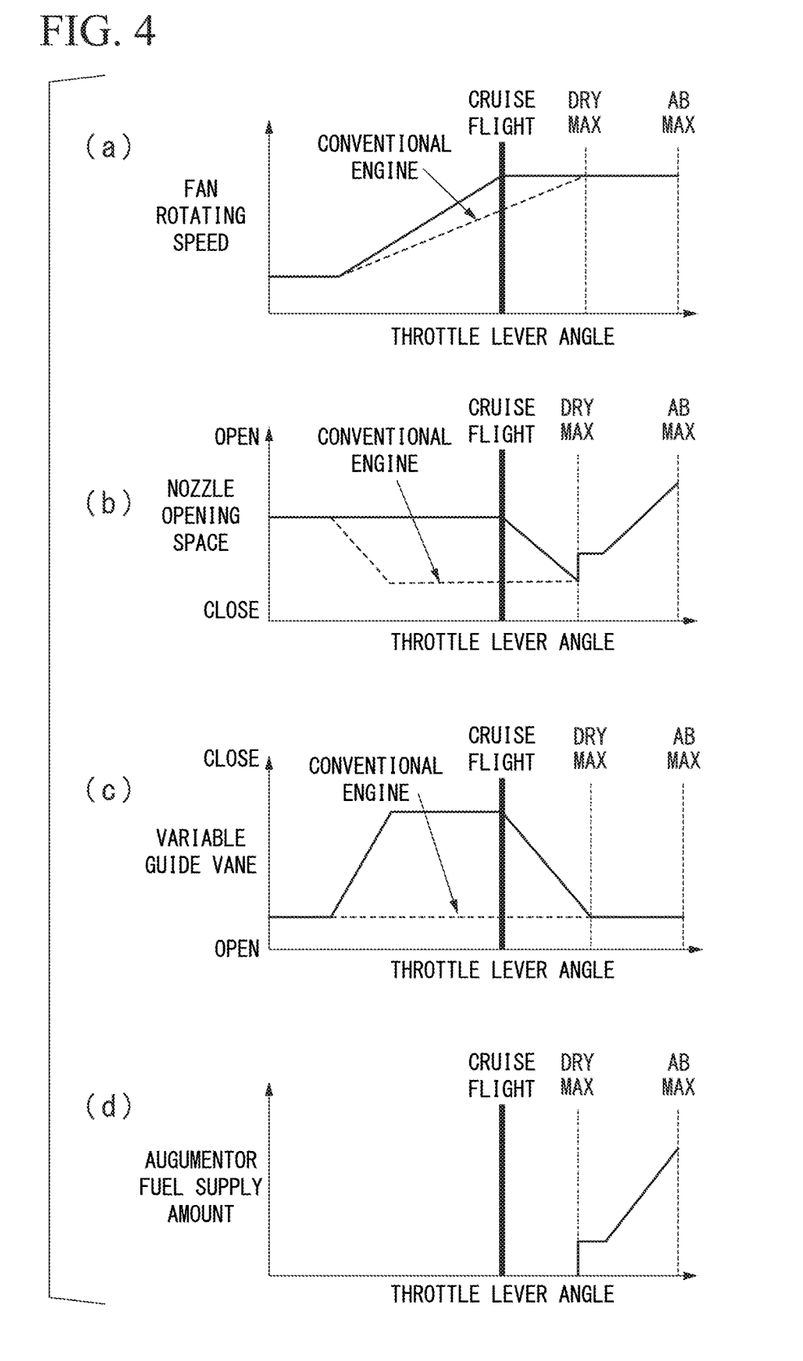
FIG. 4 shows changes in the jet engine of an embodiment of the present disclosure corresponding to the throttle lever angle. (a) of FIG. 4 is a graph showing a relationship between a throttle lever angle and rotating speed of a fan. (b) of FIG. 4 is a graph showing a relationship between the throttle lever angle and opening space of a nozzle. (c) of FIG. 4 is a graph showing a relationship between the throttle lever angle and an orientation of variable guide vanes. (d) of FIG. 4 is a graph showing a relationship between the throttle lever angle and supply amount of fuel from an augmentor.

FIG. 4 is a graph showing changes in the jet engine 1 corresponding to the throttle lever angle (that is thrust). (a)

of FIG. 4 is a graph showing a relationship between a throttle lever angle and rotating speed of the fan 3. (b) of FIG. 4 is a graph showing a relationship between the throttle lever angle and the opening space of the nozzle 11a. (c) of FIG. 4 is a graph showing a relationship between the throttle lever angle and orientation of the variable guide vanes 3f1. (d) of FIG. 4 is a graph showing a relationship between the throttle lever angle and supply amount of fuel from the augmentor 10. In FIG. 4, graphs showing the relationships in a conventional engine are shown in dashed line. In FIG. 4, "DRY MAX" means a throttle lever angle in which the maximum thrust is exerted without using the augmentor 10, and "AB MAX" means a throttle lever angle in which the maximum thrust is exerted by using the augmentor 10.

As shown in (a) of FIG. 4 and (h) of FIG. 4, in the jet engine 1 of the present embodiment, when an airplane is in cruise flight, differing from the conventional engine, rotating speed of the fan 3 is 100% and the opening space of the nozzle 11a is great. On the other hand, as shown in (c) of FIG. 4, in the jet engine 1 of the present embodiment, when an airplane is in cruise flight, the variable guide vanes 3f1 are in closed orientation (an orientation which reduces the inlet angle). Here, closing the variable guide vanes 3f1 means that area of the variable guide vanes 3f1 viewed from the rotating axis direction of the fan 3 is apparently large. In accordance with the jet engine 1 of the present embodiment, when an airplane is in cruise flight, since rotating speed of the fan 3 is 100%, it is understood that the intake flow volume of the engine is maintained high, increase in the intake spillage drag is prevented, and fuel efficiency is improved.

In the jet engine 1 of the present embodiment, as shown in (b) of FIG. 4, the opening space of the nozzle 11a is changed when an airplane is in cruise flight in which the augmentor 10 is not used. However, as shown in (d) of FIG. 4, it is understood that fuel supply amount to the augmentor 10 is not affected when the augmentor 10 is used. That is, there is no change from the conventional engine in the relationship between the throttle lever angle and fuel supply amount from the augmentor 10.

The preferred embodiment of the present disclosure has been described above with reference to the accompanying drawings. However, the present disclosure is not limited to the embodiment described above. The shapes, the combination, or the like of the respective constituent members shown in the embodiment described above is one example and various changes can be made based on design requirements or the like within a scope of the present disclosure.

For example, in the embodiment described above, a configuration is employed in which the fluid resistance at the nozzle 11a is adjusted by changing the opening space of the nozzle 11a by the movable portion 11b of the variable exhaust nozzle 11. However, the present disclosure is not limited to the configuration. For example, when the exhaust flow amount is increased, a mechanism which adjusts fluid resistance at the nozzle 11a by discharging increased amount of exhaust flow from an opening other than the nozzle 11a so as to be a thrust may be provided. Here, when the augmentor 10 is provided, an opening space varying mechanism which adjusts the opening space of the nozzle is generally included. Accordingly, by using the opening space varying mechanism as the fluid resistance adjusting device of the present disclosure, it is not necessary to add new mechanisms for adjusting fluid resistance of the nozzle.

In the above-described embodiment, a configuration in which rotating speed of the fan 3 is maximized when an airplane is in cruise flight is explained. By maximizing rotating speed of the fan 3 when an airplane is in cruise flight, since the intake flow amount of the engine is maintained high, it is possible to minimize the intake spillage drag. However, the present disclosure is not limited to the configuration but it is possible to employ a configuration in which rotating speed of the fan 3 is not maximized when an airplane is in cruise flight.

In the above-described embodiment, a configuration in which the fan 3 has three rotating blade rows. However, the present disclosure is not limited to the configuration but it is possible to apply the present disclosure to a jet engine which has a fan provided with two or more rotator blade rows.

Figure 5:
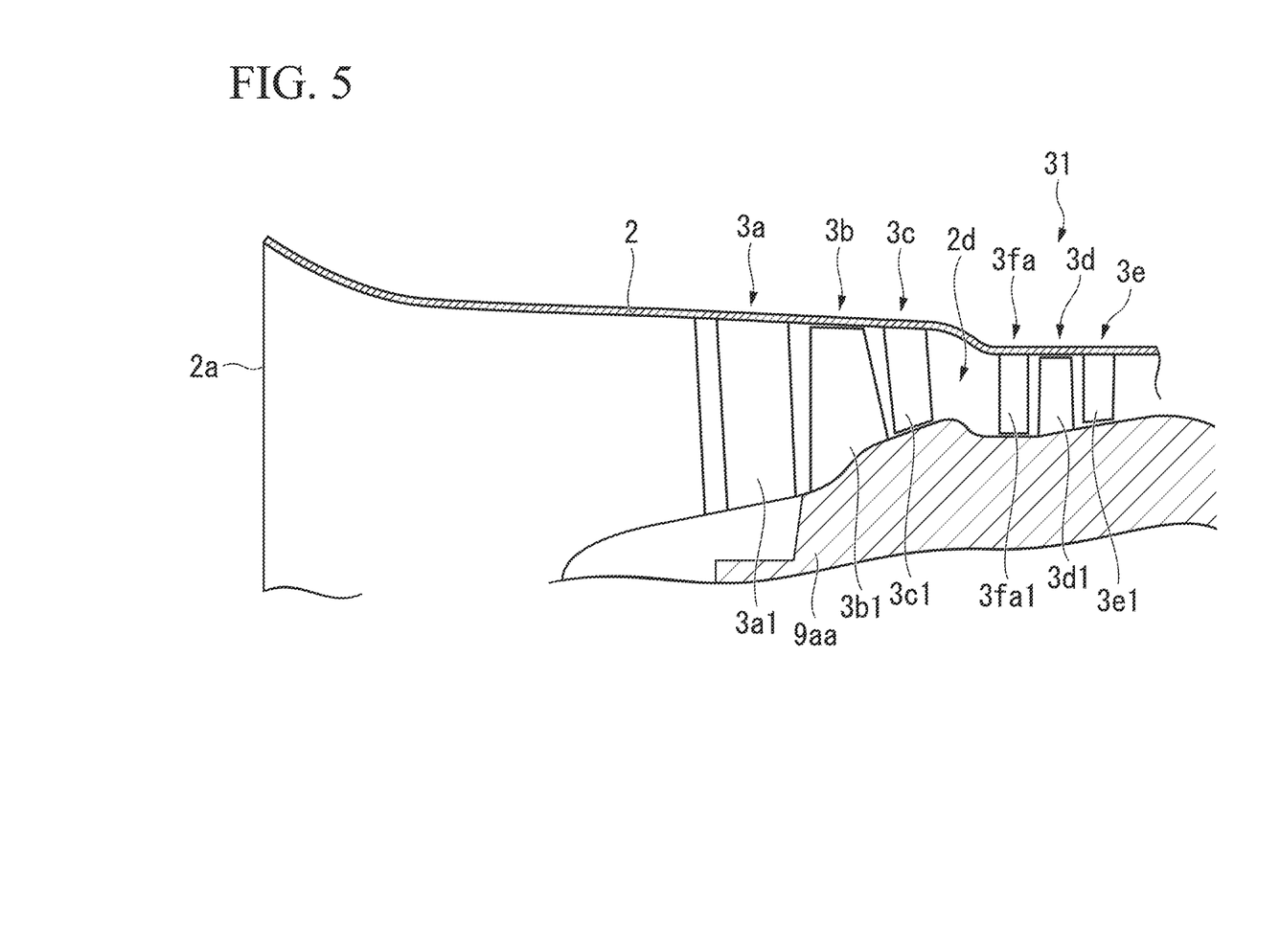
FIG. 5 is an enlarged view of a fan provided to the jet engine which is an alternative example of an embodiment of the present disclosure.

That is, as shown in FIG. 5, variable guide vanes 3fa1 of a variable guide vane mechanism 3fa disposed upstream of the rotor blades 3d1 of the second stage rotor blade row 3d in a fan 31 may have the same configuration and function as the variable guide vanes 3f1. Here, the variable guide vanes 3fa1 are disposed downstream of the first stage stator vane row 3c interposing the intermediate channel 2d. In this case as well, when defining a position of the variable guide vanes 3fa1 in relation to the intermediate channel 2d, the variable guide vanes 3fa1 are located adjacent to and upstream of the rotor blades (the rotor blades 3d1 of the second stage rotor blade row 3d) located downstream of the intermediate channel 2d. Here, as shown in FIG. 5, in this case, rotor blades of the fan 31 fixed to a low-pressure axis 9aa are the rotor blades 3b1 and the rotor blades 3d1.

Figure 6:
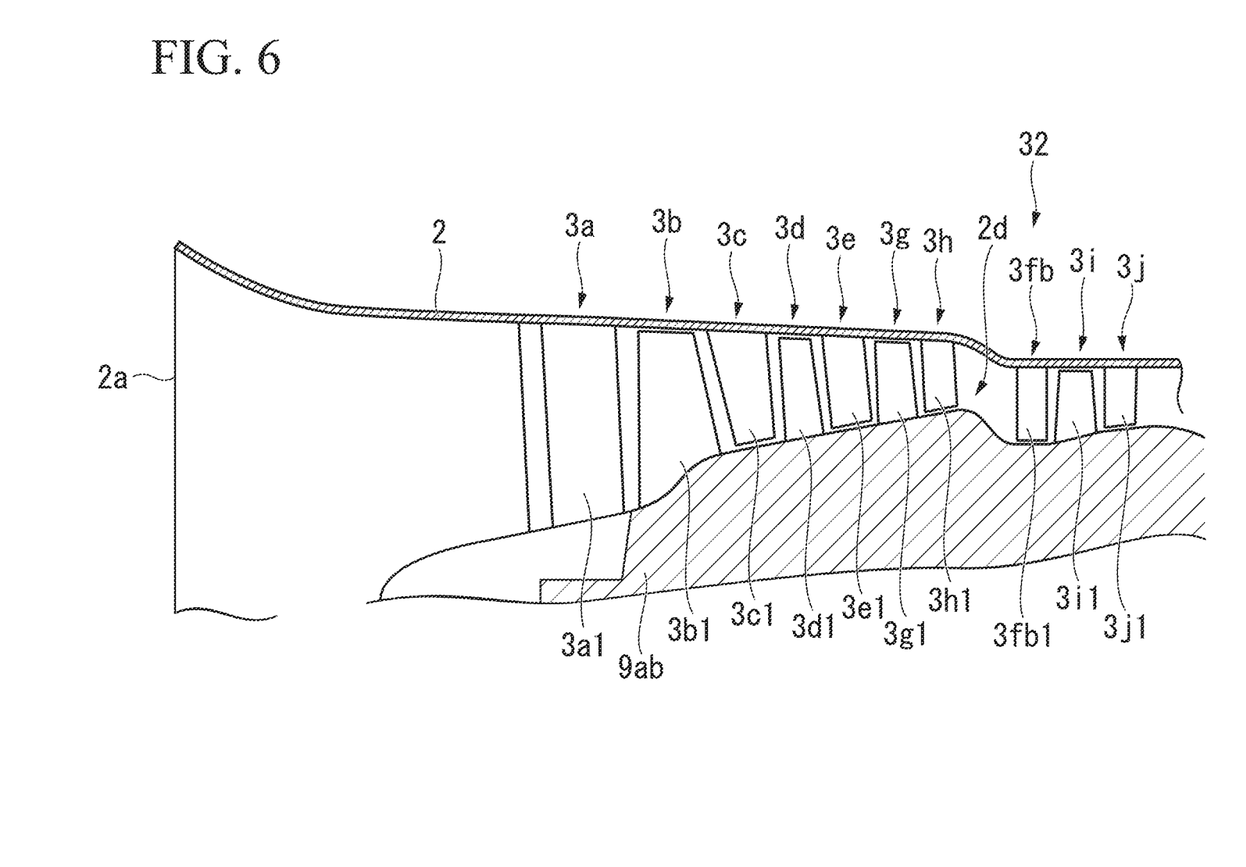
FIG. 6 is an enlarged view of a fan provided to the jet engine which is an alternative example of an embodiment of the present disclosure.

As shown in FIG. 6, variable guide vanes 3fb1 of a variable guide vane mechanism 3fb disposed upstream of rotor blades 3i1 of the fourth stage rotor blade row 3i in a fan 32 may have the same configuration and function as the variable guide vanes 3f1. Here, the variable guide vanes 3fb1 are disposed downstream of the third stage stator vane row 3h interposing the intermediate channel 2d. In this case as well, when defining a position of the variable guide vanes 3fb1 in relation to the intermediate channel 2d, the variable guide vanes 3fh1 are located adjacent to and upstream of the rotor blades (the rotor blades 3i1 of the fourth stage rotor blade row 3i) located downstream of the intermediate channel 2d. Here, as shown in FIG. 6, in this case, rotor blades of the fan 32 fixed to a low-pressure axis 9ab are the rotor blades 3b1, the rotor blades 3d1, the rotor blades 3g1, and the rotor blades 3i1.

Figure 7:
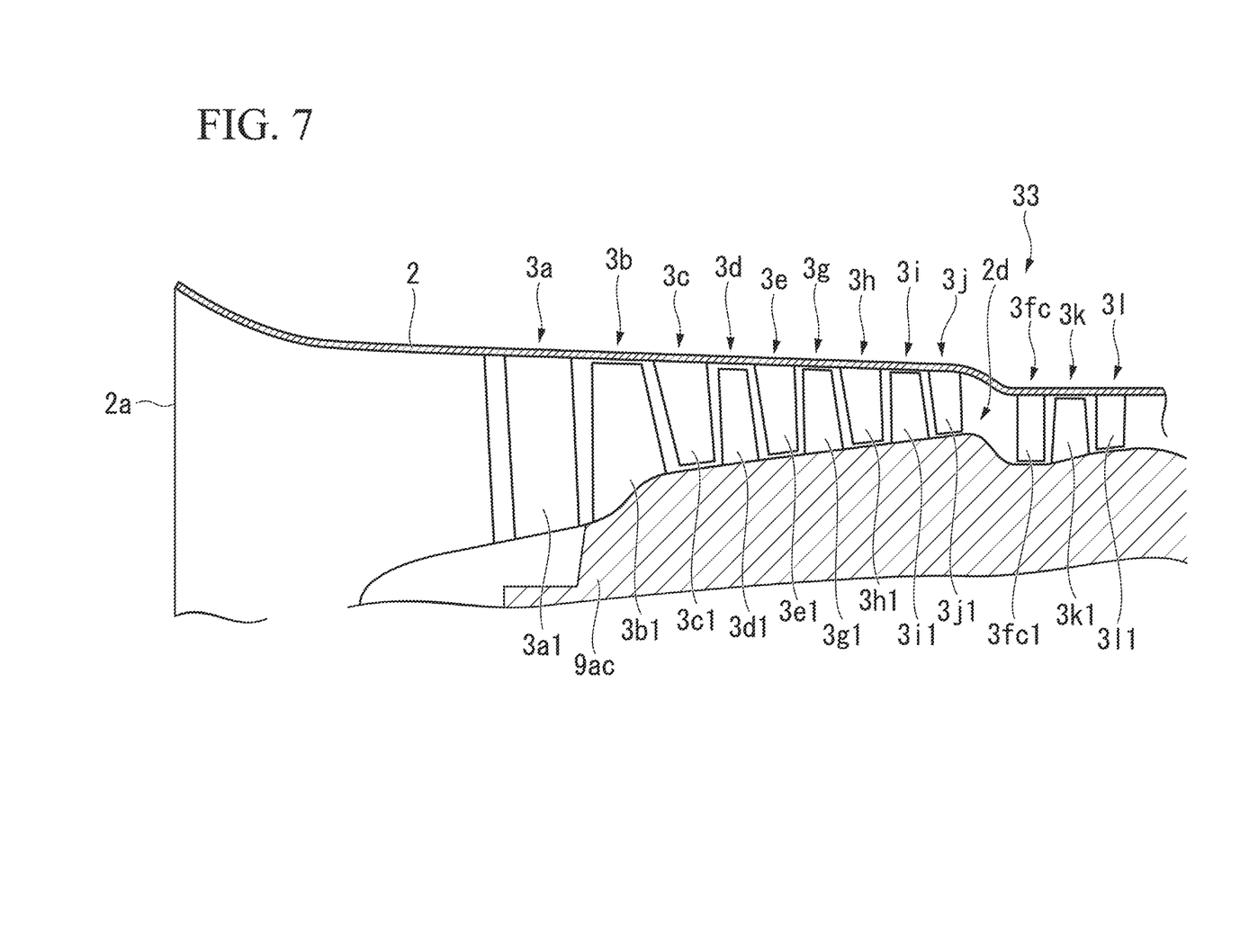
FIG. 7 is an enlarged view of a fan provided to the jet engine which is an alternative example of an embodiment of the present disclosure.

In the same manner, as shown in FIG. 7, variable guide vanes 3fc1 of a variable guide vane mechanism 3fc disposed upstream of rotor blades 3k1 of the fifth stage rotor blade row 3k in a fan 33 may have the same configuration and function as the variable guide vanes 3f1. Here, the variable guide vanes 3fc1 are disposed downstream of the fourth stage stator vane row 3j interposing the intermediate channel 2d. In this case as well, when defining a position of the variable guide vanes 3fc1 in relation to the intermediate channel 2d, the variable guide vanes 3fc1 are located adjacent to and upstream of the rotor blades (the rotor blades 3k1 of the fifth stage rotor blade row 3k) located downstream of the intermediate channel 2d. Here, as shown in FIG. 7, in this case, rotor blades of the fan 33 fixed to a low-pressure axis 9ac are the rotor blades 3b1, the rotor blades 3d1, the rotor blades 3g1, the rotor blades 3i1, and the rotor blades 3k1.

A configuration in which a variable guide vane mechanism is provided in each of a plurality of rotor blade rows may be employed.

INDUSTRIAL APPLICABILITY

In accordance with the present disclosure, in a jet engine, it is possible to improve fuel efficiency by reducing an intake spillage drag without providing a second bypass channel and necessitating a lot of driving mechanisms.

What is claimed is:

1. A jet engine comprising:
 a fan provided with a plurality of stages of rotor blades;
 a compressor which compresses air which is sent from the fan;
 a combustor which generates combustion gas by using compressed air generated by the compressor;
 a turbine which generates a driving force from the combustion gas;
 a nozzle which discharges the combustion gas;
 a cylindrical casing accommodating the fan, the compressor, the combustor, and the turbine;
 a core channel and a bypass channel which are radially divided parts of an inside of the casing downstream of the fan;
 a variable guide vane disposed upstream of the rotor blades of a third and later stage and downstream of the rotor blades of a first stage and second stage of the rotor blades of the fan and configured to adjust an inlet angle of airflow against the third and later stage of the rotor blades; and
 a movable portion comprising: flaps arranged in a circumferential direction of the nozzle; and an actuator adjusting an angle of the flaps, and configured to adjust a fluid resistance at the nozzle,
 wherein no branch of the airflow is provided at intermediate stages of the fan.

2. The jet engine according to claim 1, wherein tips of the rotor blades which are disposed downstream of the variable guide vane are disposed closer to a center of rotation of the rotor blades than tips of the rotor blades disposed upstream of the variable guide vane.

3. The jet engine according to claim 1, further comprising:
 an intermediate channel which changes a region where air flows from a radially outer side of the casing to a radially inner side of the casing where the variable guide vane is provided,
 wherein the variable guide vane is disposed adjacent to and upstream of the rotor blades disposed downstream of the intermediate channel.

4. The jet engine according to claim 3, further comprising:
 an intermediate channel which changes a region where air flows from a radially outer side of the casing to a radially inner side of the casing where the variable auide vane is provided,
 wherein the variable guide vane is disposed adjacent to and upstream of the rotor blades disposed downstream of the intermediate channel.

5. A control method of the jet engine according to claim 1, the method comprising:
 maximizing a rotating speed of the fan and maintaining a high intake flow volume of the engine at a time of cruise flight;
 suppressing an increase in air pressure at the fan by setting the inlet angle of airflow at the time of cruise flight smaller than the inlet angle of airflow at a time of acceleration by the variable guide vane;
 adjusting an opening space of the nozzle and increasing the opening space of the nozzle by the movable portion; and
 suppressing an increase in the fluid resistance due to an increase in a volume flow at an outlet of the fan corresponding to the smaller inlet angle of airflow.

* * * * *